R. R. GASKILL.
Wheel-Plow.
No. 57,889.
Patented Sept. 11, 1866.
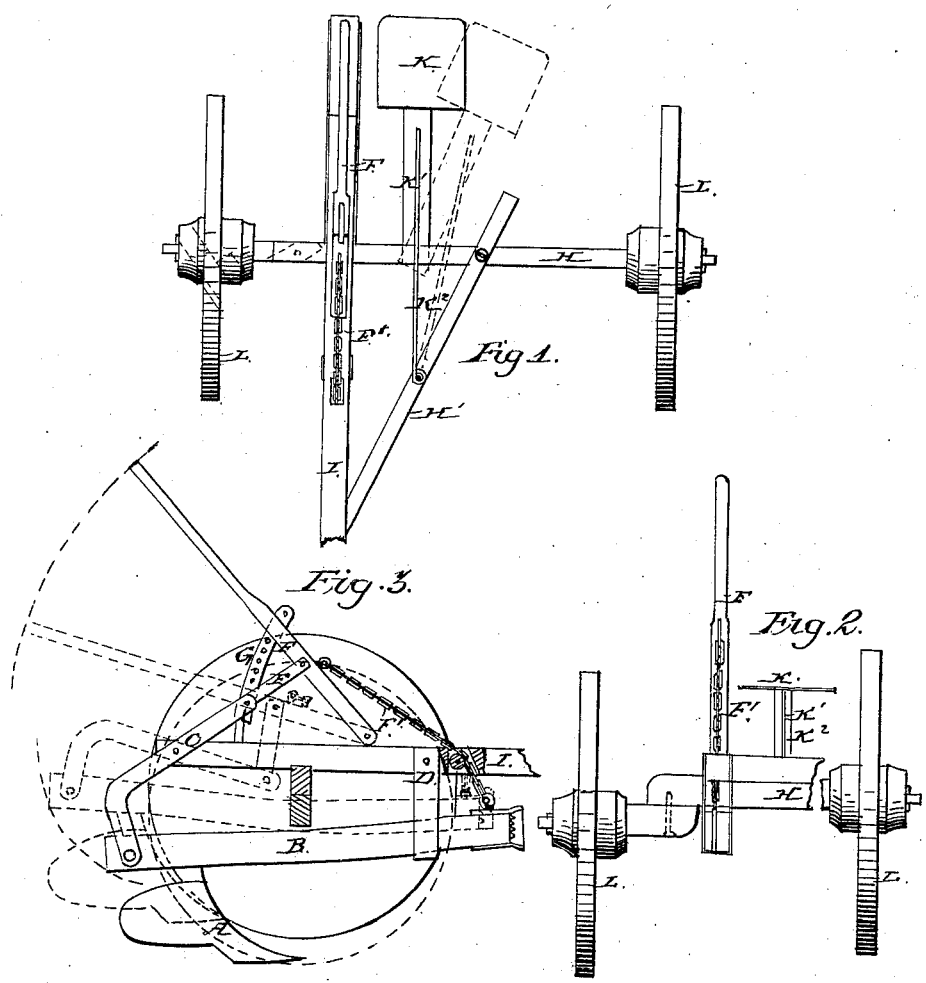
WITNESSES:
INVENTOR:
Roland R Gaskill
by
D P Holloway &
his Atty.

UNITED STATES PATENT OFFICE.

ROLAND R. GASKILL, OF MENDOTA, ILLINOIS.

IMPROVEMENT IN SULKY-PLOWS.

Specification forming part of Letters Patent No. 57,889, dated September 11, 1866.

*To all whom it may concern:*

Be it known that I, ROLAND R. GASKILL, of Mendota, in the county of La Salle and State of Illinois, have invented a new and useful Improvement in Sulky-Plows; and I do hereby declare that the following is a full, clear, and exact description of the construction and operation of the same, reference being had to the annexed drawings, making part of this specification, in which—

Figure 1 is a top view. Fig. 2 is a front view. Fig. 3 is a longitudinal section.

The same letters in the different figures are used to refer to identical parts.

My improvement relates to an arrangement for supporting an ordinary plow, of any of the usual constructions, upon wheels, and providing a convenient mechanism for adjusting it, and arranging a swinging seat in such a manner as to save the driver from the danger of being thrown off by irregularities in the ground.

A is a plow, of any ordinary construction, attached to the beam B, the rear of which is swung to the bent levers C, which are pivoted on each side to the tongue I, extended for the purpose behind the axle H. These levers are actuated through the connecting-bar E by the lever F, which is hinged on the tongue, and to which the connecting-bar E is pivoted. The chain F', attached to the top of the lever F, passes through a slot in the beam B, over a sheave, and is attached to the front end of the beam.

By throwing the end of the lever F down the plow is raised, as shown by the red lines in Fig. 3, and it may be secured by a pin passed through the standard G, which is formed with holes for the purpose, or by notches holding against a pin passing through the slot in the lever.

The axle H is bent so that the wheel L' on the mold-board side of the plow shall run below the bend of the wheel L by the depth to which it is designed that the plow shall cut the furrow. The axle will thus be level when the wheel L' is running in the furrow last cut. The plow is set level with the bottom of this wheel.

K is the driver's seat, which is attached to the axle H by the standard K', which is secured by a single round bolt, so that it may swing horizontally. The brace K, attached to the standard K' and brace H', is so attached as to permit the free lateral oscillation of the seat. This seat is thus permitted to swing freely, that the driver may not be thrown from the seat by the wheel striking against obstructions.

What I claim as my invention, and seek to secure by Letters Patent, is—

1. A sulky-plow having the driver's seat K so attached as to permit it to oscillate freely horizontally, substantially as and for the purpose set forth.

2. The hereinbefore-described mechanism for adjustably suspending the plow A by a system of levers, C, E, and F, and a chain, F', said several parts being respectively constructed and the whole combined substantially as set forth.

In testimony whereof I have signed my name to this specification in the presence of two subscribing witnesses.

ROLAND R. GASKILL.

Witnesses:
L. B. CROOKER,
J. C. CROOKER.